United States Patent [19]

Köchli

[11] Patent Number: 4,614,295

[45] Date of Patent: Sep. 30, 1986

[54] SOLDERING IRON AND SOLDERING APPARATUS

[75] Inventor: Walter Köchli, Hünibach, Switzerland

[73] Assignee: Prenco AG, Liechtenstein

[21] Appl. No.: 580,471

[22] Filed: Feb. 15, 1984

[30] Foreign Application Priority Data

Feb. 21, 1983 [CH] Switzerland .......................... 958/83
Nov. 4, 1983 [DE] Fed. Rep. of Germany ... 8331710[U]

[51] Int. Cl.⁴ .............................................. B23K 3/00
[52] U.S. Cl. ..................................... 228/53; 228/41; 228/52
[58] Field of Search ........................... 228/41, 52, 53; 226/182, 165, 166; 140/123; 318/375, 379

[56] References Cited

U.S. PATENT DOCUMENTS

| 983,208 | 1/1911 | Cobb | 228/41 |
|---|---|---|---|
| 2,119,462 | 5/1938 | Kull . | |
| 2,119,995 | 6/1938 | Mancinelli | 228/41 X |
| 2,280,879 | 4/1942 | Anderson | 228/53 |
| 2,843,073 | 7/1958 | Voss et al. | 228/53 |
| 2,871,333 | 3/1959 | Savage | 228/53 |
| 2,891,308 | 6/1959 | Lyons | 228/41 X |
| 3,112,722 | 12/1963 | Ando | 228/53 |
| 3,211,355 | 10/1965 | Zoltai | 228/52 |
| 3,358,897 | 12/1967 | Christensen | 228/41 |
| 3,391,844 | 7/1968 | Bell | 228/41 |
| 3,430,837 | 3/1969 | Hein | 228/53 |
| 3,797,725 | 3/1974 | Mori | 228/41 |
| 3,830,420 | 8/1974 | Milana et al. | 228/41 X |
| 3,990,622 | 11/1976 | Schurman, Jr. et al. | 228/53 |
| 4,206,862 | 6/1980 | Da Costa | 228/41 X |
| 4,271,383 | 6/1981 | Endo | 318/375 |
| 4,420,716 | 12/1983 | Imazeki et al. | 318/379 |
| 4,434,925 | 3/1984 | Jacobs | 228/53 X |

FOREIGN PATENT DOCUMENTS

| 0102651 | 3/1984 | European Pat. Off. . | |
|---|---|---|---|
| 917885 | 8/1954 | Fed. Rep. of Germany | 228/41 |
| 1301402 | 8/1969 | Fed. Rep. of Germany . | |
| 2503094 | 7/1976 | Fed. Rep. of Germany . | |
| GM7831576 | 3/1978 | Fed. Rep. of Germany . | |
| 8225325 | 3/1983 | Fed. Rep. of Germany . | |
| 3312421 | 10/1984 | Fed. Rep. of Germany | 228/53 |
| 2218966 | 2/1973 | France | 228/53 |
| 537345 | 12/1955 | Italy . | |
| 57-36069 | 2/1982 | Japan . | |
| 435937 | 11/1967 | Switzerland . | |
| 494419 | 4/1938 | United Kingdom . | |
| 507997 | 6/1939 | United Kingdom . | |
| 575042 | 1/1946 | United Kingdom . | |
| 628452 | 9/1948 | United Kingdom . | |
| 729463 | 5/1955 | United Kingdom . | |
| 867590 | 5/1961 | United Kingdom . | |
| 904357 | 8/1962 | United Kingdom . | |
| 1090118 | 11/1967 | United Kingdom . | |
| 1131195 | 10/1968 | United Kingdom . | |
| 1188169 | 4/1970 | United Kingdom . | |
| 1400868 | 7/1975 | United Kingdom . | |
| 1466711 | 4/1977 | United Kingdom . | |
| 2001890B | 2/1979 | United Kingdom . | |

Primary Examiner—Nicholas P. Godici
Assistant Examiner—C. Cuda
Attorney, Agent, or Firm—Ostrolenk, Faber, Gerb & Soffen

[57] ABSTRACT

The soldering apparatus of the invention includes a soldering wire feeding mechanism for feeding soldering wire from a storage spool. The soldering wire feeding mechanism includes a motor which drives a feeding wheel for engaging and transporting the soldering wire into a flexible feeding tube. An eccentric adjusting cylinder is mounted adjacent the wheel and can be turned to fit the diameter of the soldering wire being used. The feeding tube connects to the soldering iron of the invention, which has a metal guide tube through which the soldering wire extends and is fed to the soldering area. The soldering wire travels from the feeding tube to the guide tube through a sleeve to which both tubes are threaded. The free end section of the guide tube adjacent to the tip of the soldering iron extends rectilinearly from a bend or curve such that the soldering wire leaving the tube is rectilinear and not bent. Inside the guide tube is a tube shaped guide member of polytetrafluoroethylene, which guide member has at least one bead determining the inner diameter or clearance needed for optimally guiding the soldering wire. This inner diameter can be adjusted to fit the diameter of a given soldering wire or the guide tube can be replaced with a guide tube which fits. In one embodiment the guide member has two beads, a first adjacent the free end of the guide tube and a second spaced apart from the first and inside the rectilinear section of the guide tube.

16 Claims, 7 Drawing Figures

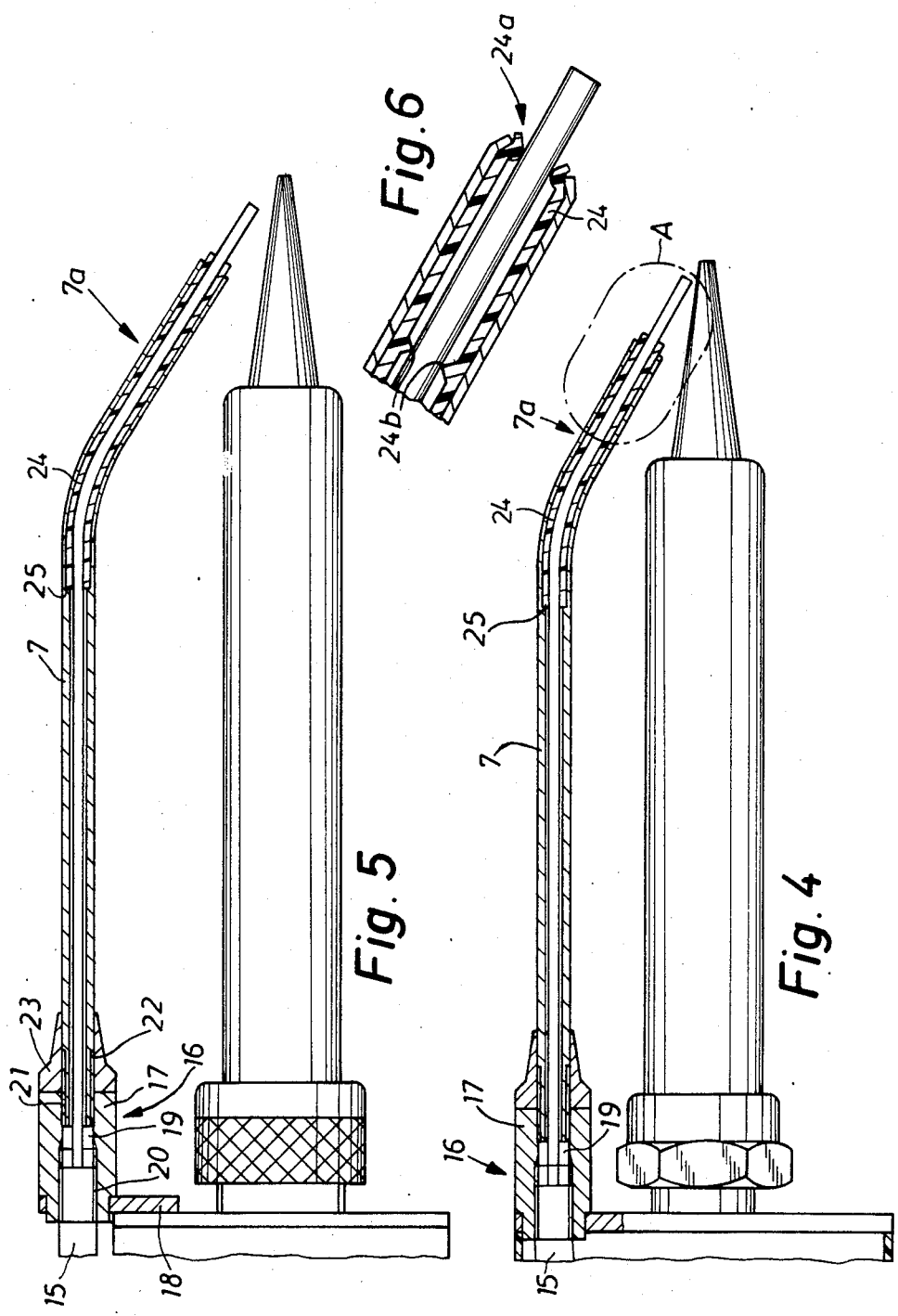

SOLDERING IRON AND SOLDERING APPARATUS

BACKGROUND OF THE INVENTION

1. Field Of The Invention

The present invention relates to a soldering apparatus in which a soldering wire is fed adjacent to the tip of a soldering iron and also relates to a hand-held soldering iron for use in such an apparatus.

2. Description Of The Prior Art

A conventional soldering apparatus is disclosed in U.S. Pat. No. 3,990,622. This soldering apparatus includes a soldering wire storage spool and a soldering wire feeding mechanism having a knurled feed wheel, which unwinds the soldering wire from the storage spool. The soldering wire is fed and guided through a hose-like tube to a metal tube which is mounted to the soldering iron. This metal tube extends to a location adjacent the soldering iron tip and directs the soldering wire onto the soldering iron tip. At its free end, i.e. the end section adjacent to the soldering iron tip, this metal tube has a curvilinear shape to guide the soldering wire along a curvilinear path onto the soldering iron tip.

As disclosed in U.S. Pat. No. 3,990,622, the driving or wire feeding mechanism, the hose-like tube and the metal tube are designed as a custom-made unit with each such unit fitting one commonly used diameter of soldering wire. It is, therefore, necessary to exchange the above described unit whenever a soldering wire having a different diameter is used, so that a large number of such units must be kept in stock. Also, the use of such a unit precludes decreasing the number of connecting lines by combining them, as, for example, by using one hose-like tube for several soldering wire diameters.

German DE-GM No. 78 31 576 discloses a soldering wire feeding mechanism of the kind described above which operates to transport a soldering wire through an electrical cable to a metal tube. A pathway through the cable may be formed by removing one electrical lead if the electrical cable has, for example, three leads. The metal tube is mounted at one end to the manual grip of the soldering iron and the opposite, free end is a curvilinearly extending section. To properly guide the soldering wire, the inner diameter of the metal tube must fit the outer diameter of a commonly used soldering wire, so that the use of a number of soldering wires having a variety of diameters is very limited. This is also true for the pathway through the above mentioned electrical cable. Due to the bent or curvilinearly extending end section of the metal tube, and considering the play or clearance at the exit opening thereof, the soldering wire will exit in a bent shape. This shape will be influenced to a large extent by the play or clearance. Therefore, it would be advantageous to provide a soldering apparatus capable of feeding a number of sizes of soldering wire and arranged so that the exiting soldering wire is not bent.

Another single-hand-soldering apparatus is disclosed in German DE-GM No. 82 25 325.0, having a tube shaped mouth piece which is movable relative to the soldering iron tip. The soldering wire is guided through the mouth piece towards the soldering iron tip. This tube shaped mouth piece is maintained by a spring in a position which prevents premature melting of the soldering wire. It would be advantageous, however, to provide a soldering apparatus in which the soldering wire would not contact the soldering area until after the soldering iron tip has heated the soldering area and which does not bend the soldering wire at the pivot axis of the mouth piece structure.

In addition, it would further be advantageous to provide a soldering apparatus in which the structure of the tube adjacent the soldering iron tip prevents blocking and incrustation of the passage through the tube.

SUMMARY OF THE INVENTION

One object of the present invention, therefore, is to provide a soldering iron which can be used in a soldering apparatus and which includes a tube for guiding the soldering wire to the soldering iron tip. More specifically, an object of the invention is to provide a soldering iron in which the tube functions to straighten the soldering wire and to prevent the blocking or incrustation of the passage through the tube.

Another object of the present invention is to provide a soldering apparatus in which soldering wire of several diameters may be used with minimal change in the apparatus.

Another object of the invention is to provide a soldering apparatus in which the movement of the soldering wire is controlled so that the soldering iron tip may contact the soldering area before the soldering wire is fed to the soldering area.

These and other objects of the invention are accomplished by a soldering iron for use in a soldering apparatus and by a soldering apparatus which includes a soldering iron.

In one embodiment, the soldering iron of the invention includes a body and a heating element on the body which has a tip for heating the soldering area. Also mounted to the body is a guide tube for feeding soldering wire to the soldering area. Inside the guide tube is a polytetrafluorethylene guide member which extends toward the soldering area at least to the end of the guide tube. The guide member has at least one annular inward projecting bead for fitting around the soldering wire. In one embodiment, this bead projects inward adjacent the free end of the guide tube.

In a further embodiment of the invention, the guide member has two annular inward projecting beads spaced apart from each other. In a further embodiment, the guide tube is detachably mounted to the body by a mounting assembly, so that the guide tube may be replaced if a different size of soldering wire is to be used. In a further embodiment the guide tube includes a rectilinear section extending from the free end toward the body of the soldering iron, and the guide member extends at least as far as the length of the rectilinear section.

The soldering apparatus of the invention includes a mechanism with a motor for feeding soldering wire through a feeding tube to a soldering iron. The power circuit for the motor includes a switch, preferably mounted on the soldering iron, for controlling the feeding of soldering wire to the soldering iron. The soldering apparatus further includes a braking circuit connected to the switch for braking the motor when the switch is opened. In the preferred embodiment, the braking circuit includes a transistor connected across the motor leads which, when in the conducting state, electrically loads the motor, thereby braking it.

In a further embodiment of the soldering apparatus, the soldering wire is fed through an adjusting means, which includes an eccentric cylinder adjustable to the diameter of the soldering wire for feeding the soldering wire in response to the motor. The adjusting means can be adjusted to obtain optimal feeding of the soldering wire.

Due to the adjusting means and the detachable guide tube, adjustment of the soldering apparatus for different diameters of soldering wire is greatly simplified. It is also easy to adjust the free end of the guide tube in relation to the tip of the soldering iron. Furthermore, the guide member acts as a heat insulator and, therefore, prevents blocking and incrustation of the passage through the guide member by exiting material from the soldering wire. Any bending or curvature of the soldering wire as it is fed to the soldering iron is straightened in the rectilinear free end of the guide tube. As a result, the soldering wire is directed such that it forms an angle smaller than 90° with the soldering iron tip. The beads which are provided in the guide member assist in straightening the soldering wire and prevent the soldering material from accumulating at the free end of the guide tube, which would otherwise result in blocking and incrustation of the guide member passage. The bead at the free end of the guide tube may be mechanically adjusted to fit the soldering wire diameter to a close tolerance, or, if necessary, the guide tube can be removed and replaced.

The switch on the soldering iron permits the operator to start and stop the feeding of the soldering wire with great precision, because the braking circuit stops the motor immediately when the switch opens. Also, by using the switch, the operator may heat the soldering area before feeding the soldering wire into the soldering area, thereby eliminating cold solder joints.

Other objects, features and advantages of the invention will be apparent from the following description, together with the accompanying drawings and the appended claims.

BRIEF DESCRIPTION OF THE DRAWINGS

FIG. 4 is a side view of a part of the soldering iron of FIG. 2, partially in section.

FIG. 5 is a side view of an alternative embodiment of the soldering iron, partially in section.

FIG. 6 is an enlarged view of area A in FIG. 4, showing the free end of the guide tube.

DESCRIPTION OF THE PREFERRED EMBODIMENT

Figure 1:
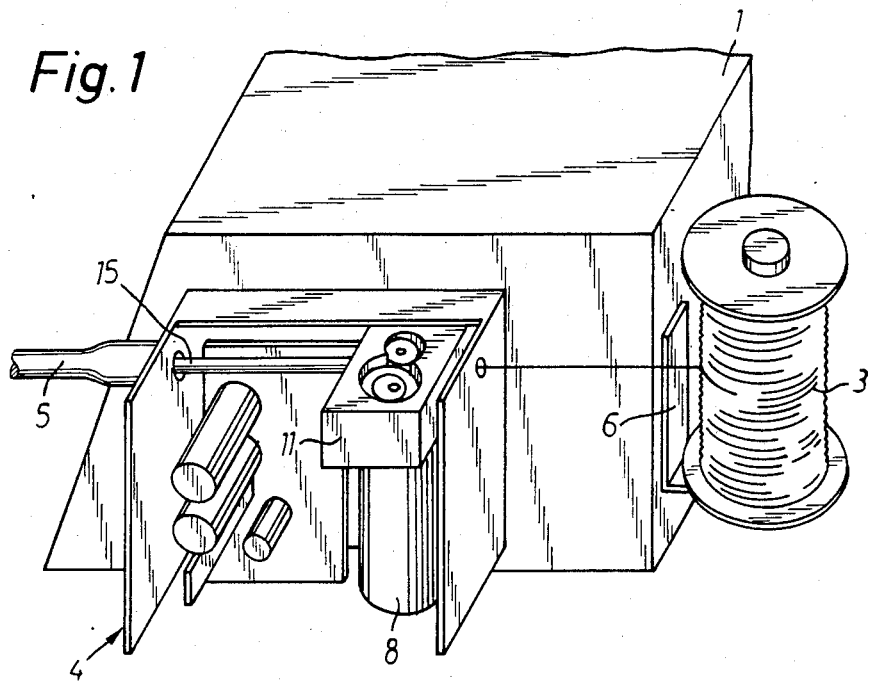
FIG. 1 is a perspective view of a part of the soldering apparatus of the invention, showing the feeding mechanism.
Figure 2:
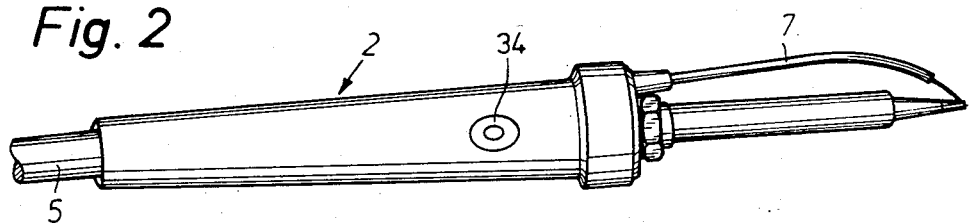
FIG. 2 is a perspective view of the soldering iron of the invention.

The soldering apparatus shown in FIGS. 1 and 2 comprises a power supply unit 1, a soldering iron 2, a soldering wire storage spool 3 and a soldering wire feeding mechanism 4. The soldering iron 2 is connected to the power supply unit 1 in a well known way and the connecting electrical leads (not shown) are arranged within a plastic feeding tube 5. The soldering wire storage spool 3 or other storage means is placed on a support 6 which in turn is mounted to the casing of the power supply unit 1.

A metal guide tube 7 is mounted to the soldering iron 2 which guide tube 7 extends up to a point adjacent and close to the tip of the soldering iron heating element. The soldering wire is guided through and directed by this guide tube 7 into the soldering area.

Figure 3:
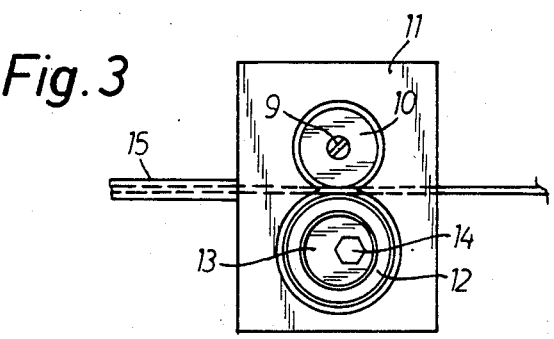
FIG. 3 is a plan view of the adjusting means which forms a part of the feeding mechanism of FIG. 1.

The soldering wire feeding mechanism 4 comprises drive means such as geared motor 8 and a wheel 10 mounted on the driving axis 9 of this geared motor 8, as shown in FIG. 3. The geared motor 8 is mounted to a guide block 11 in the frame of feeding mechanism 4 and guide block 11 has a through opening for feeding the soldering wire. The geared motor 8 is mounted to the guide block 11 and wheel 10 projects into the through opening such that the soldering wire extending through the through opening engages and is transported by wheel 10. An adjusting device is also mounted within the guide block 11 adjacent wheel 10, which adjusting device consists of a ball bearing 12 and a support 13. The ball bearing 12 is mounted on the circumference of support 13 and operates to urge the soldering wire against wheel 10. Support 13 is eccentrically mounted in the guide block 11 and is provided with a bolt or a hexagonal recess 14 allowing an adjustment of the adjusting device toward or away from wheel 10 by means of a socket wrench. This is done by turning the bolt or hexagonal recess 14, which turns support 13 around its eccentric axis, thereby moving ball bearing 12 toward or away from wheel 10. Accordingly, the clearance between wheel 10 and the adjusting device can be adjusted to fit the diameter of the soldering wire being used for optimal transporting and feeding of the soldering wire.

FIGS. 4 and 5 show metal guide tube 7 detachably mounted at one of its ends to the manual grip section or body of the soldering iron 2 by means of a mounting assembly 16. The other side of the mounting assembly 16 is connected to a hose-like feeding tube 15 mounted at its opposite end to the guide block 11 for trouble free feeding of the soldering wire.

The mounting assembly 16 comprises a sleeve 17 which is directly mounted to the manual grip section or body of the soldering iron 2 as in FIG. 4, or mounted thereto by a plate 18, as in FIG. 5. The sleeve 17 is provided with a through bore 19 having sections 20, 21 each provided with an inner thread. The metal guide tube 7 and feeding tube 15 each have an outer thread and are threadably connected to sections 21 and 20, respectively. To this end, guide tube 7 is provided with a section 22 having an outer thread and a lock nut 23 is threaded thereupon. This lock nut 23 locks the guide tube 7 in place.

The metal guide tube 7 comprises at its opposite, free end a rectilinear section 7a. Guide tube 7 is bent or curved at an obtuse angle in a curved section and then extends a distance toward and at an acute angle with respect to the soldering iron tip to form rectilinear section 7a. As shown in FIG. 4, the soldering wire is directed by rectilinear section 7a toward a point adjacent the soldering iron tip in the preferred embodiment. This permits the soldering wire to contact the object to be soldered rather than the soldering iron tip, so that the solder flux cleans the object. In addition, rectilinear section 7a extends for a length sufficient to straighten the bends in the soldering wire from the feeding operation.

A tube shaped guide member 24 made of polytetrafluorethylene (Teflon) is located within the inner opening in guide tube 7. The guide member 24 extends upstream from an end outside and beyond the free end of the guide tube 7 along a part of the inner opening of guide tube 7. In order to lock the guide member 24 within the guide tube 7, tube 7 is machined with a shoulder 25 therein. The guide member 24 abuts shoulder 25 at one end and is locked in place by the bent or curved shape of the mouth piece section of tube 7 adjacent rectilinear section 7a. Therefore, guide member 24 extends at least to the curved section. The inner diameter of the shoulder 25 is somewhat smaller than the inner diameter of rectilinear section 7a.

The outermost end section at the free end of the guide tube 7 is bent inwards as shown in FIG. 6 and, accordingly, a section of the guide member is also bent forming a bead 24a projecting inwards. This bead is machined so that the inner diameter at the mouth section fits the outer diameter of the soldering wire which will be fed. In addition, guide member 24 extends beyond the outer end of tube 7, as shown.

The guiding of the soldering wire can be improved by forming a second bead 24b within the rectilinearly extending section 7a as shown in FIG. 6. This second bead 24b may be located about one inch from the first bead 24a.

Figure 7:
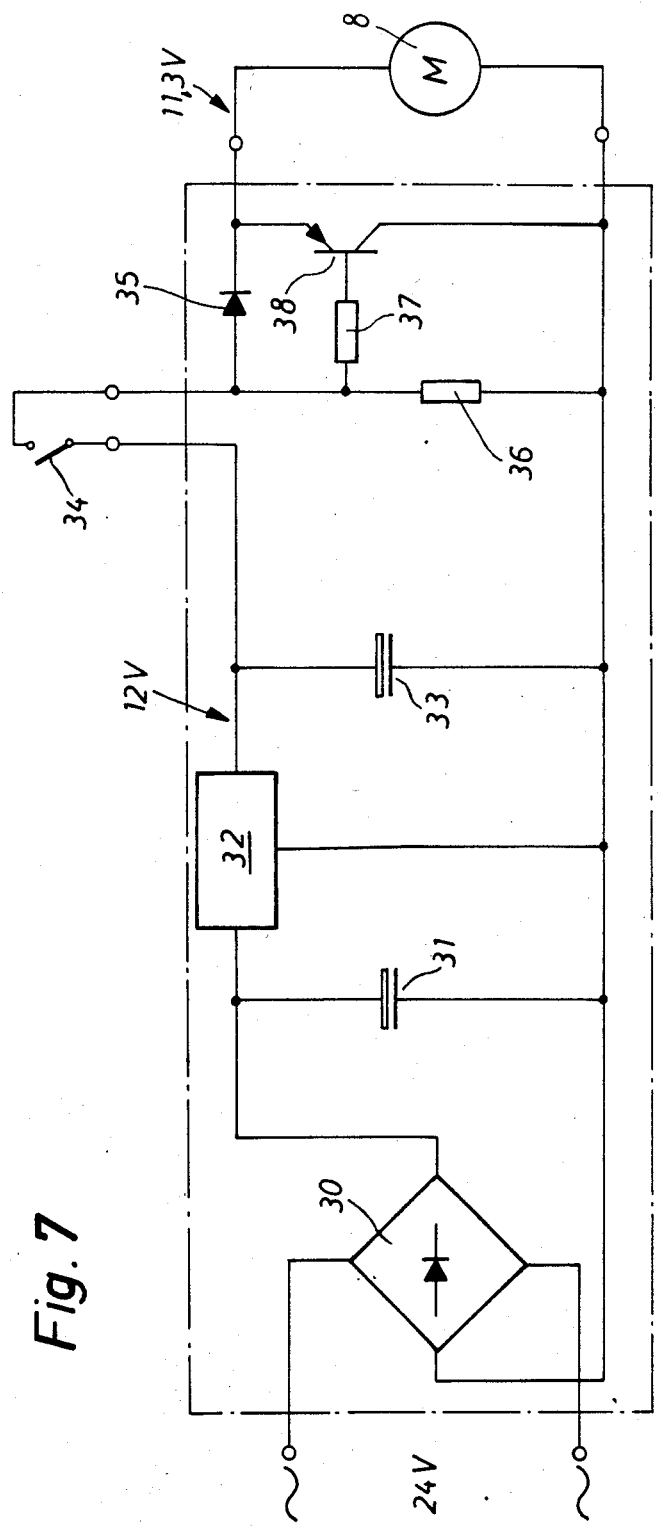
FIG. 7 is a circuit diagram including the braking circuit for controlling the feeding mechanism shown in FIG. 1.

FIG. 7 shows an electrical circuit for controlling the soldering wire feeding mechanism of a soldering apparatus. More specifically, the circuit controls geared motor 8, thus forming part of the drive means. An isolating transformer provides a voltage of about 24 volts which is rectified by bridge circuit 30 and smoothed by a capacitor 31. A voltage regulator 32 connected thereto provides at its output the requisite 12 volts DC across a further capacitor 33 in order to avoid possible oscillation. This voltage is fed through the operation switch 34 located on the soldering iron 2 and drives the geared motor 8. The additional components illustrated in FIG. 7 define a circuit which brakes and stops the motor 8 when switch 34 is opened. Otherwise, motor 8 would slow down and stop gradually.

When the switch 34 is depressed, the electric current will be fed to the motor 8 through diode 35 in its conducting or low resistance direction. A resistor 36 is connected between the 12 volt supply and ground. A further resistor 37 connects the base of a pnp transistor 38 to the 12 volt supply when switch 34 is closed. The emitter of transistor 38 is connected through diode 35 to only 11.3 volts due to the voltage drop across diode 35. As a result, the emitter-base junction is reverse biased and transistor 38 will not conduct. The motor rotates without any disturbance at 11.3 volts.

If switch 34 is then opened, motor 8 will temporarily operate as a generator and will continue to generate a positive voltage at its positive pole. This voltage reaches the emitter of the transistor 38, but reverse-biased diode 35 prevents it from reaching resistors 36, 37. Therefore resistor 36 will pull down the transistor base through resistor 37 to 0 volts. Therefore, the transistor 38 will be in a conducting state as long as its emitter receives a positive voltage from motor 8. The conducting transistor 38 short circuits the poles of motor 8, so that the motor operating as a generator is electrically loaded. This obviously leads to a mechanical loading and accordingly an effective braking of the rotating elements.

When switch 34 is again closed, the base of transistor 38 will immediately be connected to the power supply through the resistor 37, turning off the transistor 38. Therefore, the motor 8 can operate as a common motor as before.

When preparing the soldering apparatus for operation, the soldering wire is threaded past wheel 10 after the adjusting assembly 12, 13, 14 has been adjusted to the diameter of the soldering wire being used. The soldering wire will be fed through the feeding tube 15 and the metal guide tube 7 towards the soldering iron tip. The soldering wire will be bent or curved prior to reaching the rectilinear section 7a. The bend of the soldering wire which heretofore has been a drawback will be eliminated in rectilinear section 7a, and the wire will be straightened. The inner diameter of the bead 24a fitting the diameter of the soldering wire will accurately guide the soldering wire adjacent to the soldering iron tip.

Due to the inventive design of the soldering apparatus, the soldering area will be heated first, typically. Then the soldering wire will be fed into the soldering area by operation of switch 34. This sequence avoids to a large extent the formation of so called "cold soldering joints". The soldering apparatus can be easily adjusted to fit various diameters of soldering wires by adjusting the adjusting assembly 13, 14 accordingly and by exchanging the metal guide tube 7. Instead of exchanging guide tube 7, it would also be possible to mechanically machine the bead 24a if only one bead is provided. It is also possible to bend the mouth section of the metal tube still further to alter the shape of the bead 24a such that the exit opening is adjusted to the diameter of the soldering wire being used.

The above description also illustrates that the feeding mechanism of the invention can be easily mounted to an already existing soldering apparatus. Minimal changes would be necessary, such as mounting support 6 and guide block 11 and connecting to the power supply unit 1. In order to reduce the number of leads between the power supply unit 1 and the soldering iron 2, the guiding tube 15 and the electrical leads (not shown) could be inserted together in a common plastic hose 5.

While the present invention has been described in connection with presently preferred embodiments thereof many other variations and modifications will now become apparent to those skilled in the art. It is preferred, therefore, that the present invention be limited not by the specific disclosure herein, but only by the appended claims.

What is claimed is:

1. A soldering iron for use in a soldering apparatus, comprising:
  a body;
  a heating element on the body and having a tip disposed in a forward direction from the body for heating a soldering area;
  a guide tube having an inner opening for feeding soldering wire to the soldering area, the guide tube being mounted to the body and extending in the forward direction therefrom, the guide tube having a free end disposed adjacent the tip of the heating element for directing soldering wire into the soldering area as it is fed through the inner opening; and
  a tube shaped guide member mounted in the inner opening of the guide tube and extending in the forward direction at least to the free end of the guide tube for guiding the soldering wire, the guide member having at least one annular inward projecting bead that surrounds said solder wire in substantially circumferential line contact and for guiding the soldering wire into the soldering area at a position adjacent the heating element tip.

2. The soldering iron of claim 1 in which the guide member comprises a polytetrafluorethylene tube.

3. The soldering iron of claim 1 in which a first annular bead of the guide member projects inward adjacent the free end of the guide tube.

4. The soldering iron of claim 3 in which a second annular bead of the guide member projects inward at a location spaced apart and toward the body from the first annular bead.

5. The soldering iron of claim 4 in which the guide tube has a rectilinear section extending from the free end thereof toward the body, the second annular bead projecting inward within the rectilinear section of the guide tube.

6. The soldering iron of claim 1 in which the guide tube has a rectilinear section extending from the free end thereof toward the body for straightening soldering wire as it is fed.

7. The soldering iron of claim 6 in which the guide tube has a curved section bounding the rectilinear section on the side toward the body, the guide member extending from the free end of the guide tube to at least the curved section thereof.

8. The soldering iron of claim 1 in which the soldering iron further comprises a mounting assembly for detectably mounting the guide tube to the body.

9. The soldering iron of claim 8 in which the mounting assembly comprises a sleeve mounted to the body having a forward end disposed in the forward direction for connecting to the guide tube and a rear end disposed opposite the forward end for connecting to a feeding tube for feeding soldering wire into the soldering iron.

10. The soldering iron of claim 9 in which the forward end and rear end of the sleeve each have an inner thread, the guide tube and feeding tube each having an outer thread for threadably connecting to the inner threads of the forward end and rear end of the sleeve, respectively.

11. The soldering iron of claim 10 in which the outer thread of the guide tube extends beyond the forward end of the sleeve, the mounting assembly further comprising a lock nut rotatably mounted on the guide tube for threadably locking the guide tube in place.

12. A soldering apparatus comprising:
(1) a feeding mechanism for feeding soldering wire, comprising:
(A) a frame;
(B) a support on the frame for supporting a soldering wire storage means;
(C) a motor on the frame for feeding soldering wire from the soldering wire storage means; and
(D) a power circuit for providing power to the motor, the power circuit comprising;
(i) a switch for opening and closing for turning the motor off and on, respectively; and
(ii) a braking circuit for braking the motor and for stopping the feeding of the soldering wire immediately when the switch is opened to turn off the motor wherein the motor has a positive and a negative pole and a pnp transistor has an emitter connected to the positive pole of said motor, a collector connected to the negative pole of said motor, and a base connected to the switch, the braking circuit further comprising a diode connected between the base and the emitter of the transistor for conducting power to said motor and for maintaining said transistor in a non-conducting state when said switch is closed and for being reverse biased when said switch is opened so as to permit said transistor to enter a conducting state for short-circuiting the poles of said motor;
(2) a feeding tube connected for receiving the soldering wire as it is fed by the feeding mechanism; and
(3) a soldering iron connected for receiving the soldering wire from the feeding tube and for directing the soldering wire into a soldering area.

13. The soldering apparatus of claim 12 in which the switch is integrally mounted in the soldering iron for permitting an operator to hold the soldering iron and operate the switch at the same time.

14. The soldering apparatus of claim 12 in which the soldering iron comprises:
(A) a body;
(B) a heating element mounted to the body and having a tip disposed in a forward direction from the body for heating a soldering area;
(C) a guide tube having an inner opening connected for receiving soldering wire from the feeding tube and for feeding soldering wire to the soldering area, the guide tube being mounted to the body and extending in the forward direction therefrom, the guide tube having a free end disposed adjacent the tip of the heating element for directing soldering wire into the soldering area as it is fed; and
(D) a tube shaped guide member mounted in the inner opening of the guide tube and extending in the forward direction at least to the free end of the guide tube, the guide member having at least one annular inward projecting bead for fitting around the soldering wire.

15. The soldering apparatus of claim 14, in which the soldering iron further comprises a mounting assembly for detachably mounting the guide tube to the body for permitting replacement of the guide tube for fitting different diameters of soldering wire.

16. A soldering iron for use in a soldering apparatus, comprising:
a body;
a heating element on the body and having a tip disposed in a forward direction from the body for heating a soldering area;
a guide tube having an inner opening for feeding soldering wire to the soldering area, the guide tube being mounted to the body and extending in the forward direction therefrom, the guide tube having a free end disposed adjacent the tip of the heating element for directing soldering wire into the soldering area as it is fed through the inner opening; and
a tube shaped guide member mounted in the inner opening of the guide tube and extending in the forward direction at least to the free end of the guide tube for guiding the soldering wire, the guide member having a plurality of spaced apart annular inward projecting beads that surround said solder wire in substantially circumferential line contact for guiding the soldering wire into the soldering area at a position adjacent the heating element tip.

* * * * *